(12) United States Patent
Hall (10) Patent No.: US 10,326,979 B2
(45) Date of Patent: Jun. 18, 2019

(54) IMAGING SYSTEM COMPRISING REAL-TIME IMAGE REGISTRATION

(71) Applicant: Microsoft Technology Licensing, LLC, Redmond, WA (US)

(72) Inventor: Michael Anthony Hall, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 17 days.

(21) Appl. No.: 15/161,309

(22) Filed: May 23, 2016

(65) Prior Publication Data

US 2017/0339395 A1    Nov. 23, 2017

(51) Int. Cl.
| | |
|---|---|
| H04N 13/246 | (2018.01) |
| H04N 13/111 | (2018.01) |
| H04N 13/257 | (2018.01) |
| G06K 9/32 | (2006.01) |
| G06T 7/00 | (2017.01) |
| G06T 7/80 | (2017.01) |
| G06T 7/33 | (2017.01) |
| H04N 13/239 | (2018.01) |

(52) U.S. Cl.
CPC ............ H04N 13/246 (2018.05); G06K 9/32 (2013.01); G06T 7/0024 (2013.01); G06T 7/344 (2017.01); G06T 7/85 (2017.01); H04N 13/111 (2018.05); H04N 13/239 (2018.05); H04N 13/257 (2018.05); *G06T 2207/10012* (2013.01); *G06T 2207/10024* (2013.01)

(58) Field of Classification Search
None
See application file for complete search history.

(56) References Cited

U.S. PATENT DOCUMENTS

| | | | |
|---|---|---|---|
| 5,852,672 | A | 12/1998 | Lu |
| 5,978,521 | A | 11/1999 | Wallack et al. |
| 6,101,455 | A | 8/2000 | Davis |
| 6,591,011 | B1 | 7/2003 | Nielsen |
| 6,618,076 | B1 | 9/2003 | Sukthankar et al. |
| 6,795,590 | B1 | 9/2004 | Chen |

(Continued)

FOREIGN PATENT DOCUMENTS

| | | |
|---|---|---|
| CN | 1356528 A | 7/2002 |
| CN | 102597693 A | 7/2012 |

(Continued)

OTHER PUBLICATIONS

Brauer-Burchardt, et al., "Fringe Projection Based High Speed 3D Sensor for Real-time Measurements", In Proceedings of Optical Measurement Systems for Industrial Inspection, vol. 8082, Issue 1, 8 Pages.*

(Continued)

*Primary Examiner* — Heather R Jones (57) ABSTRACT

A multi-camera imager (MCI) configured to register a first image of a scene acquired by a first camera comprised in the MCI to a second image of the same scene acquired by a second camera in the MCI based on adjusting a transform configured to register images of a calibration target acquired by the first and second cameras for a same fixed position and orientation of the calibration target using epipolar line segments in one of the cameras associated with image plane coordinates in the other of the cameras.

20 Claims, 6 Drawing Sheets

(56) References Cited

U.S. PATENT DOCUMENTS

| | | |
|---|---|---|
| 6,816,187 B1 | 11/2004 | Iwai et al. |
| 7,015,954 B1 | 3/2006 | Foote et al. |
| 7,133,570 B1 | 11/2006 | Schreier et al. |
| 7,307,655 B1 | 12/2007 | Okamoto et al. |
| 7,429,999 B2 | 9/2008 | Poulin et al. |
| 7,740,361 B2 | 6/2010 | Jaynes et al. |
| 7,899,270 B2 | 3/2011 | Kim et al. |
| 8,290,246 B1 | 10/2012 | Schairer et al. |
| 8,355,601 B2 | 1/2013 | Ding et al. |
| 8,401,242 B2 | 3/2013 | Newcombe et al. |
| 8,401,276 B1 | 3/2013 | Choe et al. |
| 8,421,865 B2 | 4/2013 | Euler et al. |
| 8,577,202 B2 | 11/2013 | Sikora et al. |
| 8,619,144 B1 | 12/2013 | Chang et al. |
| 9,124,831 B2 | 9/2015 | Mullis |
| 9,210,404 B2 | 12/2015 | Hall |
| 9,210,417 B2 | 12/2015 | Hall |
| 10,027,954 B2 | 7/2018 | Hall |
| 2001/0019621 A1 | 9/2001 | Hanna et al. |
| 2002/0113878 A1 | 8/2002 | Iwai et al. |
| 2002/0122113 A1 | 9/2002 | Foote |
| 2003/0090577 A1 | 5/2003 | Shirakawa |
| 2004/0091171 A1 | 5/2004 | Bone |
| 2005/0117034 A1 | 6/2005 | Cutler |
| 2005/0185049 A1 | 8/2005 | Iwai et al. |
| 2007/0104361 A1 | 5/2007 | Alexander |
| 2007/0122014 A1 | 5/2007 | Sato |
| 2008/0199078 A1 | 8/2008 | Lam et al. |
| 2009/0021614 A1 | 1/2009 | Baker et al. |
| 2009/0285361 A1 | 11/2009 | Akahori |
| 2010/0134634 A1 | 6/2010 | Witt |
| 2010/0295948 A1 | 11/2010 | Xie et al. |
| 2011/0122308 A1 | 5/2011 | Duparre |
| 2011/0211046 A1 | 9/2011 | Stumber et al. |
| 2011/0317005 A1 | 12/2011 | Atkinson |
| 2011/0317906 A1 | 12/2011 | Wallack et al. |
| 2012/0050488 A1 | 3/2012 | Cohen et al. |
| 2012/0148145 A1 | 6/2012 | Liu et al. |
| 2012/0169842 A1 | 7/2012 | Chuang et al. |
| 2012/0194517 A1 | 8/2012 | Izadi et al. |
| 2012/0229628 A1 | 9/2012 | Ishiyama et al. |
| 2012/0287240 A1 | 11/2012 | Grossmann et al. |
| 2013/0208081 A1 | 8/2013 | Xiong et al. |
| 2013/0251218 A1 | 9/2013 | Eriksson Jarliden |
| 2013/0259131 A1 | 10/2013 | Kondo |
| 2014/0034731 A1 | 2/2014 | Gao et al. |
| 2014/0043473 A1 | 2/2014 | Gupta et al. |
| 2014/0168378 A1 | 6/2014 | Hall |
| 2014/0253738 A1 | 9/2014 | Mullis |
| 2014/0285676 A1 | 9/2014 | Barreto et al. |
| 2014/0313347 A1 | 10/2014 | Wu et al. |
| 2015/0022669 A1* | 1/2015 | Hall ............... H04N 17/002 348/187 |
| 2015/0109414 A1 | 4/2015 | Adam et al. |
| 2015/0109418 A1 | 4/2015 | Lin |
| 2015/0181199 A1 | 6/2015 | Yu et al. |
| 2015/0192439 A1 | 7/2015 | Mihelich et al. |
| 2015/0249822 A1 | 9/2015 | Falk |
| 2015/0288951 A1 | 10/2015 | Mallet et al. |
| 2015/0346471 A1 | 12/2015 | Schwarz et al. |
| 2016/0039094 A1 | 2/2016 | Lundberg |
| 2016/0117820 A1 | 4/2016 | Oh |
| 2017/0094251 A1 | 3/2017 | Wolke et al. |
| 2017/0287166 A1 | 10/2017 | Claveau et al. |
| 2017/0337700 A1 | 11/2017 | Wilson et al. |
| 2017/0339400 A1 | 11/2017 | Hall |

FOREIGN PATENT DOCUMENTS

| | | |
|---|---|---|
| CN | 102740115 A | 10/2012 |
| CN | 104463833 A | 3/2015 |
| EP | 0537021 A2 | 4/1993 |
| EP | 1378790 A2 | 1/2004 |
| EP | 2141932 A1 | 1/2010 |
| EP | 2711895 A2 | 3/2014 |
| JP | 2003065714 A | 3/2003 |
| WO | 2010127418 A1 | 11/2010 |
| WO | 2013015699 A1 | 1/2013 |
| WO | 2014093946 A1 | 6/2014 |
| WO | 2015009650 A1 | 1/2015 |

OTHER PUBLICATIONS

"International Search Report and Written Opinion Issued in PCT Application No. PCT/US2017/032776", dated Aug. 10, 2017, 15 Pages.

Burchardt, et al., "Fringe Projection Based High Speed 3D Sensor for Real-time Measurements", In Proceedings of Optical Measurement Systems for Industrial Inspection, vol. 8082, Issue 1, 8 Pages.

Xia, et al., "Efficient and Accurate Camera Calibration Based on Planar Pattern", In Journal of Advanced Materials Research, vol. 204-210, Feb. 2011, 2 pages.

Deng, et al., "Registration of Multiple RGBD Cameras via Local Rigid Transformations", In Proceedings of IEEE International Conference on Multimedia and Expo, Jul. 14, 2014, 6 pages.

Daftry, et al., "Flexible and User-Centric Camera Calibration using Planar Fiducial Markers", In Proceedings of 24th British Machine Vision Conference, Sep. 9, 2013, pp. 1-13.

Atcheson, et al., "CALTag: High Precision Fiducial Markers for Camera Calibration", In Proceedings of 15th International Workshop on Vision, Modeling and Visualization, Nov. 15, 2010, 8 pages.

Bobrowitsch, et al., "Digital stereophotogrammetry based on circular markers and zooming cameras: evaluation of a method for 3D analysis of small motions in orthopaedic research", In Journal of BioMedical Engineering OnLine, vol. 10, Issue 1, Feb. 2011, 16 pages.

Berry, et al., "A Visual Servoing-Based Method for ProCam Systems Calibration", In Journal of Sensors, vol. 13, Issue 10, Oct. 1, 2013, pp. 13318-13333.

"Performance Evaluation using Ground-Truthed, 3D Data Sets", Published on: Jun. 26, 2011, Available at: http://www.visualsize.com/3DDemo/comparison/accuracy.html.

Zhang, Zhengyou, "Flexible Camera Calibration by Viewing a Plane From Unknown Orientations", In Proceedings of the Seventh IEEE International Conference on Computer Vision, Sep. 20, 1999, 8 pages.

Wientapper, et al., "A camera-based calibration for automotive augmented reality Head-Up-Displays", In Proceedings of IEEE International Symposium on Mixed and Augmented Reality, Oct. 1, 2013, pp. 183-197.

Zhang, Z., "Camera Calibration", In Publications of Prentice Hall—Emerging Topics in Computer Vision, Jun. 23, 2013, pp. 1-37.

Li, et al., "Multiple Camera Calibration Toolbox", In Proceedings of IEEE/RSJ International Conference on Intelligent Robots and Systems, Nov. 3, 2013, 2 pages.

Furukawa, et al., "Accurate Camera Calibration from Multi-View Stereo and Bundle Adjustment", In Journal International Journal of Computer Vision, vol. 84, Issue 3, Sep. 2009, pp. 1-12.

"Microsoft Live Labs Introduces Photosynth, a Breakthrough Visual Medium", Retrieved From http://news.microsoft.com/2008/08/20/microsoft-live-labs-introduces-photosynth-a-breakthrough-visual-medium/#sm.0000zvtkudoqedd3wr2240hvevh7o, Aug. 20, 2008, 3 Pages.

"Non Final Office Action Issued in U.S. Appl. No. 13/715,723", dated May 15, 2015, 10 Pages.

"Non-Final Office Action Issued in U.S. Appl. No. 13/944,498", dated Jan. 15, 2015, 23 Pages.

"Notice of Allowance Issued in U.S. Appl. No. 13/944,498", dated Jul. 17, 2015, 10 Pages.

"Non Final Office Action Issued in U.S. Appl. No. 15/161,310", dated Aug. 30, 2017, 7 Pages.

"Notice of Allowance Issued in U.S. Appl. No. 15/161,310", dated Mar. 27, 2018, 6 Pages.

"Non Final Office Action Issued in U.S. Appl. No. 15/161,314", dated Feb. 8, 2018, 17 Pages.

(56) References Cited

OTHER PUBLICATIONS

"First Office Action Issued in Chinese Patent Application No. 201480040740.6", dated Oct. 24, 2016, 12 Pages.

Boufama, et al., "Epipole and fundamental matrix estimation using virtual parallax", In Proceedings of Fifth International Conference on Computer Vision, Jun. 20, 1995, pp. 1030-1036.

Burrus, Nicolas, "Kinect Calibration", Retrieved From: http://nicolas.burrus.name/index.php/Research/KinectCalibration, Aug. 7, 2011, 4 Pages.

Dang, et al., "Continuous Stereo Self-Calibration by Camera Parameter Tracking", In Proceedings of IEEE Transactions on Image Processing, vol. 18, Issue 7, Jul. 2009, pp. 1536-1550.

Gheta, et al., "3D Fusion of Stereo and Spectral Series Acquired With Camera Arrays", Retrieved From https://www.intechopen.com/books/image-fusion-and-its-applications/3d-fusion-of-stereo-and-spectral-series-acquired-with-camera-arrays, Jun. 24, 2011, pp. 73-92.

Herrera, et al., "Joint Depth and Color Camera Calibration with Distortion Correction", In Transactions on Pattern Analysis and Machine Intelligence, vol. 34, Issue 10, Oct. 2012, pp. 2058-2064.

"International Search Report and Written Opinion Issued In PCT Application No. PCT/US2013/075206", dated Feb. 10, 2014, 10 Pages.

"International Preliminary Report on Patentability Issued in PCT Patent Application No. PCT/US2014/046583", dated Sep. 28, 2015, 6 Pages.

"International Search Report and Written Opinion Issued In PCT Patent Application No. PCT/US2014/046583", dated Oct. 30, 2014, 8 Pages.

"Written Opinion Issued in PCT Patent Application No. PCT/US2014/046583", dated Jun. 22, 2015, 5 Pages.

"International Search Report and Written Opinion Issued in PCT Application No. PCT/US2017/032994", dated Aug. 10, 2017, 15 Pages.

"International Search Report and Written Opinion Issued in PCT Application No. PCT/US2017/032996", dated Aug. 10, 2017, 17 Pages.

Tang, et al., "Fast and Robust Algorithms Using Coplanar Constraints to Estimate Fundamental Matrices", In Proceedings of IEEE International Conference on Systems, Man and Cybernetics, Oct. 11, 2006, 11 Pages.

Zhang, "A flexible new technique for camera calibration", In Proceedings of IEEE Transactions on Pattern Analysis and Machine Intelligence, vol. 22, Issue 11, Nov. 1, 2000, 23 Pages.

Zhang, et al., "Calibration Between Depth and Color Sensors for Commodity Depth Cameras", In Proceedings of IEEE International Conference on Multimedia and Expo, Jul. 11, 2011, 6 Pages.

* cited by examiner

IMAGING SYSTEM COMPRISING REAL-TIME IMAGE REGISTRATION

BACKGROUND

Multi-camera (MC) imaging systems, which may also be referred to as MC imagers (MCIs) comprise a plurality of cameras configured to substantially simultaneously image a scene from different poses (different positions and/or orientations) to acquire images of the scene that provide different data of scene characteristics. For example, a MCI may comprise a time of flight (TOF) range camera that provides distances to features in a scene and an RGB (red, green, blue) "picture camera" that provides a color image of the scene. The color image of the scene may be used to identify features of the scene for which the TOF range camera provides distances. A MCI stereo imaging system comprises at least two picture cameras that image a scene from different poses and determines binocular disparity from the images for features in the scene to determine distances to the features. Which may be used to characterize spectral characteristics of features in the scene in different optical wavelength bands.

To correctly associate data provided by the images of a same scene acquired by different component cameras of a MCI, the images have to be registered to each other so that it can be determined which pixels in the different images correspond and image same features in the scene. Registering the images involves registering the cameras, which comprises determining how to determine which pixels comprised in the camera photosensors of different component cameras of the MCI correspond and image the same features in a scene imaged by the imaging system.

SUMMARY

Aspects of embodiments of the disclosure relate to providing simplified procedures for determining calibration and run-time registrations for component cameras of a MCI. In an embodiment, the component cameras may be calibrated "at the factory" and a calibration registration determined for the component cameras by operating the MCI under controlled imaging conditions so that the component cameras acquire, optionally substantially simultaneously, images of a same optionally planar "calibration target" at a known calibration position and orientation relative to the MCI. The images, hereinafter also referred to as "calibration images", may be used to calibrate the cameras and determine a calibration registration mapping that associates image coordinates of images of same features of a scene acquired by the different component cameras. In accordance with an embodiment of the disclosure, for run-time imaging, "in the field", run-time registration of images of the scene acquired by the different component cameras may be provided by adjusting the calibration registration mapping for parallax. Run-time parallax adjustment for run-time images of a scene in accordance with an embodiment of the disclosure may be made along an epipolar line in an imaging plane of one of the component cameras that corresponds to an image projection line of another of the component cameras.

In an embodiment of the disclosure, the registration target comprises a planar rectilinear grid of rows and columns of fiducial icons. A pan angle and/or tilt angle of a given component camera comprised in the MCI imaging system relative to a plane of the fiducial target icons may be determined based on angles at which the parallel rows and columns of fiducial icons appear to converge in images of the calibration target acquired by the given component camera. The pan and tilt angles may be used to determine epipolar lines for the given component camera corresponding to image projection lines of another of the component cameras and/or provide a mapping between camera pixels in the given component camera and camera pixels in other cameras of the MC imaging system.

In an embodiment of the disclosure, the calibration registration mapping comprises a set of polynomial mapping functions that map x and y image coordinates of images of a scene in an image plane of a first of the component cameras to corresponding x and y image coordinates of images of the same scene in the image plane of a second of the component cameras. Conventional mapping of camera image coordinates from a first component camera to a second component camera comprised in a MCI is conventionally based on a matrix, referred to as a fundamental matrix "F", which may be used to map image coordinates in the first component camera to image coordinates in the second component camera. The matrix F is a 3×3 matrix having 7 degrees of freedom whose component elements may be determined from image coordinates of corresponding images in the first and second cameras for at least eight features of a scene that both cameras image. In an embodiment of the disclosure, polynomial mapping functions that map image coordinates from first to second component cameras of a MCI are used to generate a plurality of at least eight virtual calibration fiducials that are imaged by both cameras. Coordinates of virtual images in both cameras corresponding to the virtual calibration fiducials are processed to determine a fundamental matrix for the two cameras that may be used to map image coordinates from one to the other of the component cameras.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

Registering component cameras of a MCI is typically a complex task performed "at the factory" to provide a "factory" or "calibration registration" of the component cameras. The task generally entails operating the MCI under carefully controlled conditions to image a calibration target having a pattern of easily identified features, also referred to as "fiducials", at a plurality of different poses in the fields of view (FOV) of the component cameras. Images of the target acquired by the component cameras are processed to identify the fiducials and their respective locations in each of the images. The locations are used to calibrate the cameras to determine intrinsic features of the component cameras, and to determine a calibration "registration mapping" for the cameras that maps camera pixels from one to the other of the component cameras. At "run-time" use of the MCI to acquire images, "in the field", conditions under which the MCI is used to acquire images may not be controlled. A calibration registration of the component cameras may therefore advantageously be adjusted to provide an adjusted "run-time" or "field" registration for the MCI that operates to register images acquired by the component cameras during field use of the MCI.

Figure 1A:
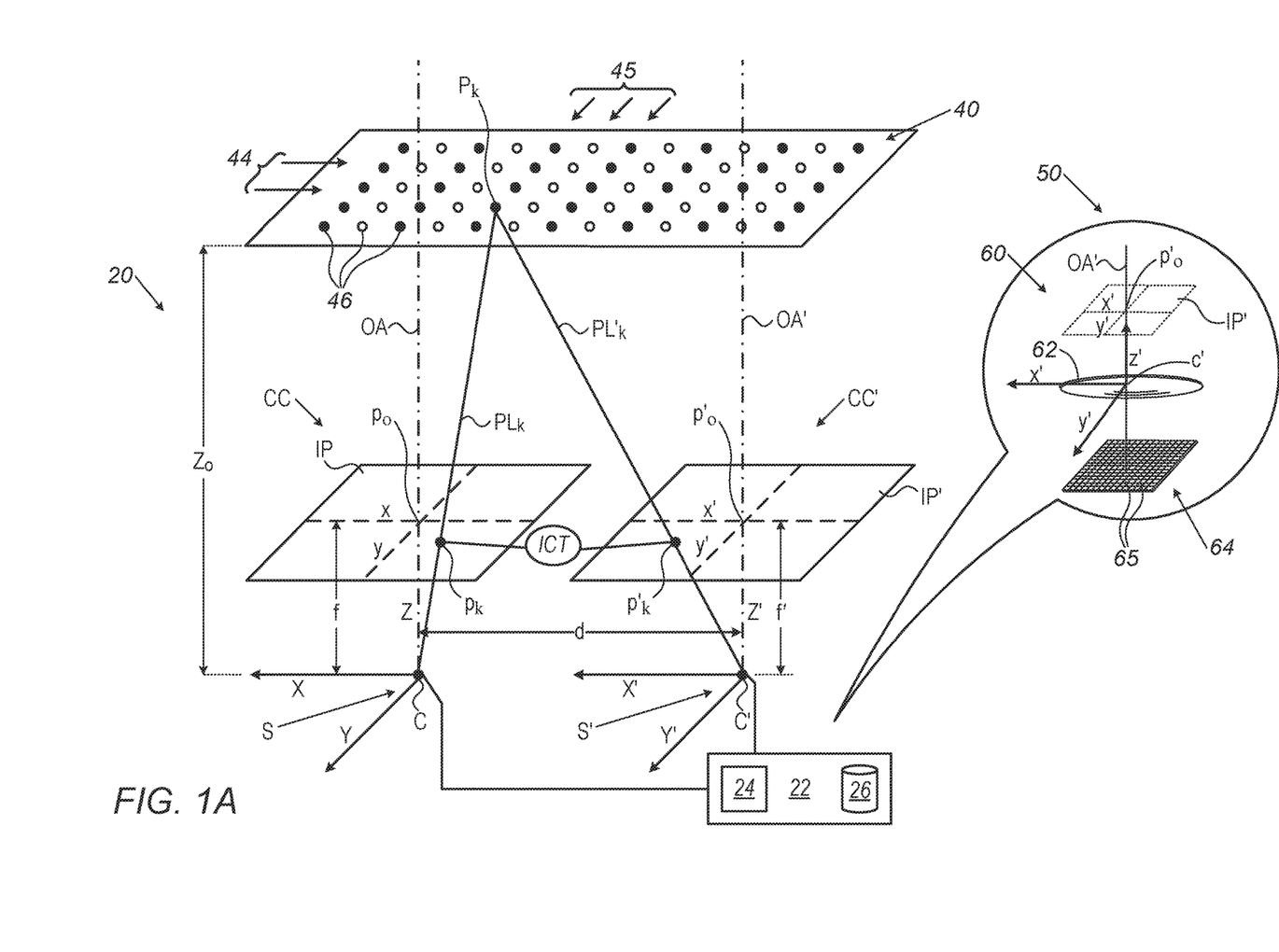
FIG. 1A schematically illustrates a MCI comprising two component cameras imaging a calibration target to register the component cameras one to the other, in accordance with an embodiment of the disclosure.
Figure 1B:
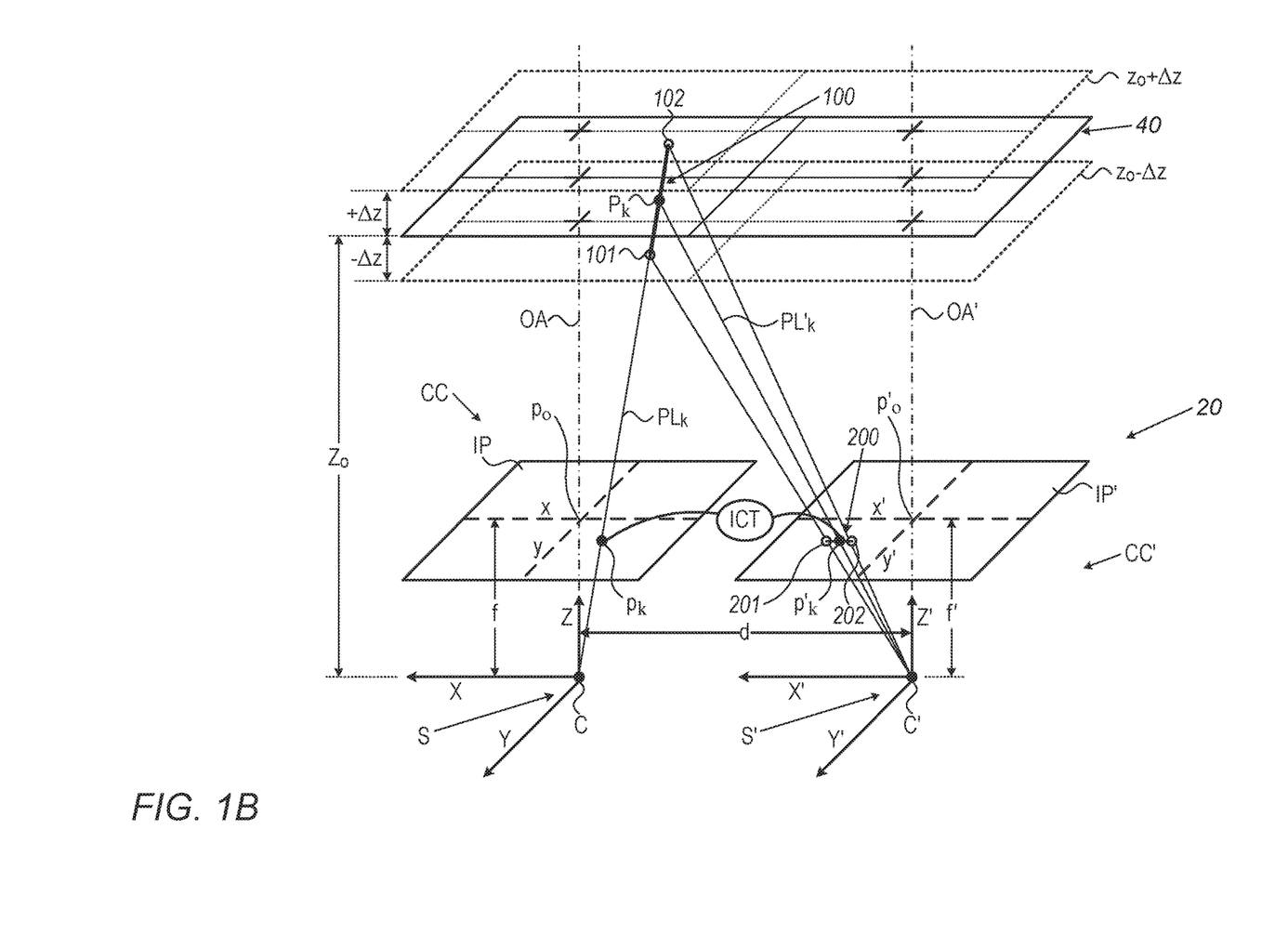
FIG. 1B schematically shows the MCI shown in FIG. 1A and a segment of an epipolar line in one of the component cameras corresponding to an imaging projection line in the other of the component cameras, which epipolar segment may be used to provide run-time registration for images acquired by the MCI, in accordance with an embodiment of the disclosure.
Figure 1C:
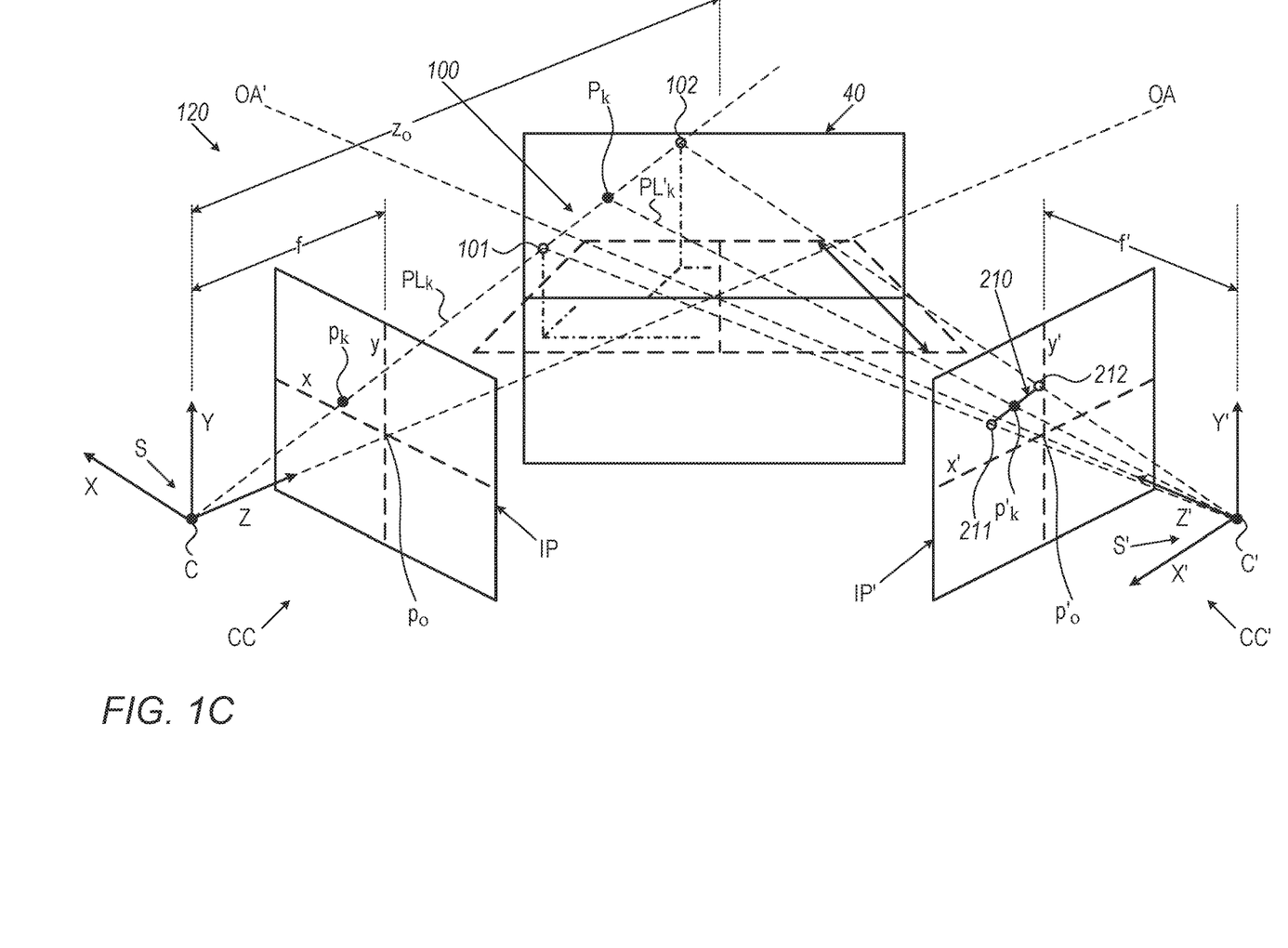
FIG. 1C shows a MCI comprising two component cameras, rotated by pan angles relative to a calibration target, a projection line along which a point is imaged on an image plane of one of the cameras and a segment of an epipolar line in the image plane of the other of the cameras corresponding to the projection line, in accordance with an embodiment of the disclosure.
Figure 2A:
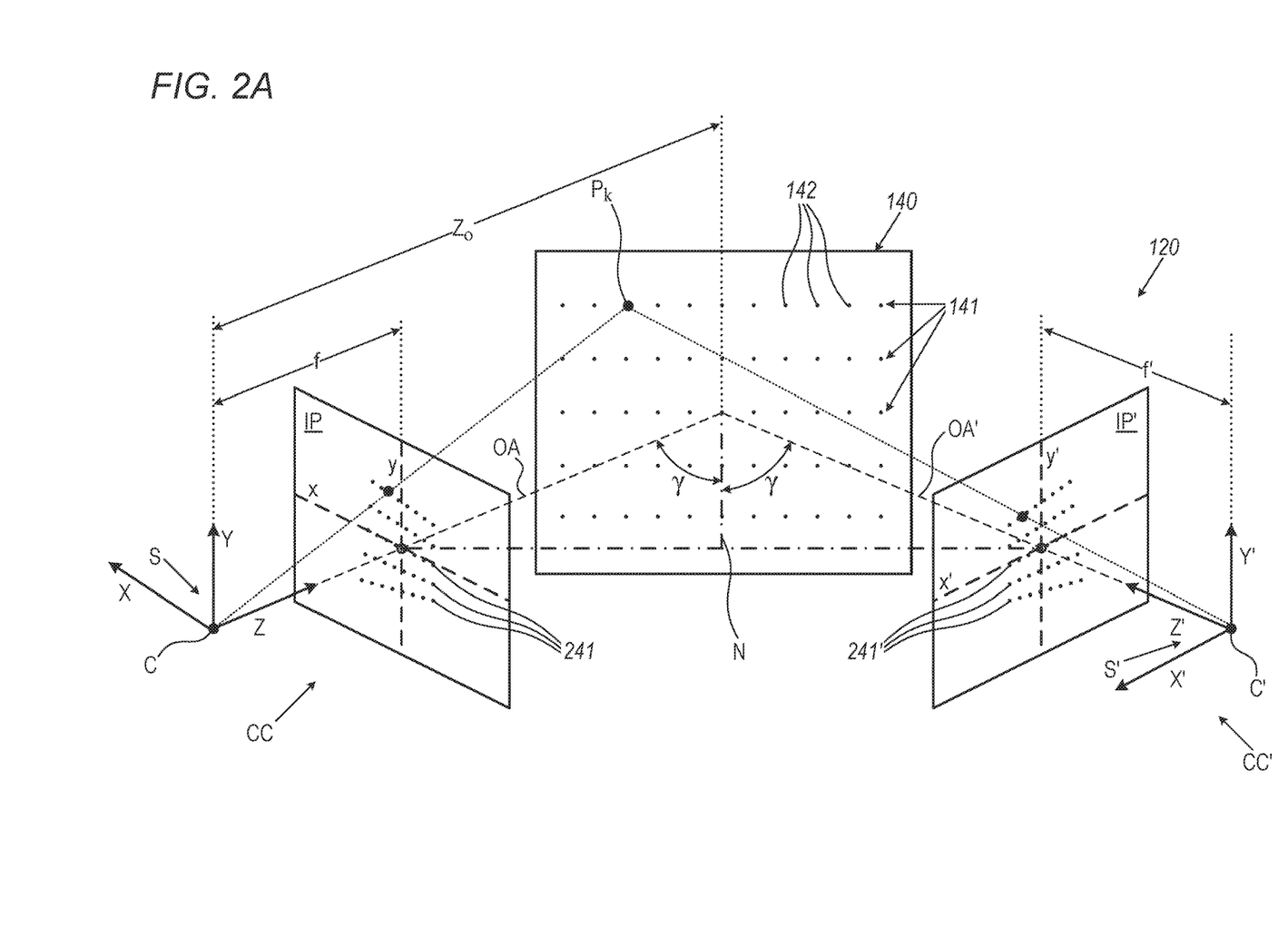
FIGS. 2A and 2B schematically illustrate a method of determining a pan angle of component cameras of a MCI relative to a calibration target, in accordance with an embodiment of the disclosure.

In the following detailed description a method of determining a calibration registration for a MCI comprising, optionally, two component cameras and using the calibration registration to determine a run-time registration of images acquired by the component cameras is described with reference to FIGS. 1A-1C. FIG. 1A schematically shows the MCI imaging a calibration target located at a known calibration position and orientation relative to the MCI to establish a calibration registration of the component cameras of the MCI. Position and orientation of a calibration target or scene relative to an MCI may be determined relative to any convenient coordinate system that may be used to define poses of component cameras in the MCI. FIG. 1B schematically shows an epipolar line segment in one of the component cameras based on which a parallax correction may be made to provide run-time registration for the MCI using the calibration registration in accordance with an embodiment of the disclosure. FIG. 1C schematically shows an epipolar line segment based on which run-time registration corrections may be made for parallax for an MCI for which the component cameras are rotated by a pan angle. Determining pan and tilt angles for a camera are discussed with reference to FIGS. 2A and 2B. The figures illustrate how parallel rows of fiducials in a calibration target are imaged as non-parallel, converging fiducial rows in images acquired by component cameras of the MCI shown in FIG. 1C and how the convergence may be used to determine pan angles of the component cameras in accordance with an embodiment of the description. FIG. 3 schematically illustrates generating virtual fiducials that may be used for converting polynomial registration functions for the MCIs shown in FIGS. 1A-2B to determine a conventional fundamental matrix that may be used for registering the component cameras of the MCI.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which the embodiment is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. Unless otherwise indicated, the word "or" in the description and claims is considered to be the inclusive "or" rather than the exclusive or, and indicates at least one of, or any combination of more than one of items it conjoins.

FIG. 1A schematically shows a MCI 20 comprising first and second component cameras CC and CC' respectively imaging a calibration target 40 to provide a calibration registration of the cameras to each other in accordance with an embodiment of the disclosure. Component cameras CC and CC' are idealized as pinhole cameras.

Component camera CC comprises a center of projection "C", considered to be a center of component camera C, an optical axis OA and a principal point $p_O$ at an intersection of optical axis OA with an image plane IP of camera CC. Image plane IP is perpendicular to optical axis OA and is located at a distance from C equal to a focal length f of component camera CC. Features of a scene imaged by component camera CC are located in space relative to the component camera by coordinates of a camera coordinate system S having right hand Cartesian axes X, Y, Z and an origin of coordinates at center C of camera CC. An image of a feature of a scene imaged by camera CC is projected to a location on image plane IP having coordinates in the image plane that are defined relative to x and y image plane coordinate axes having an origin of coordinates at principal point $p_O$. Similarly, component camera CC' comprises a center of projection C', optical axes OA', principal point $p_O'$ on an imaging plane IP' located at a distance equal to a focal length f' from center C'. Features of a scene imaged by camera CC' are located in space relative to camera CC' by coordinates along a camera coordinate system S' having axes X', Y', Z'. An image of a feature of a scene imaged by component camera CC' is projected to a location on image plane IP' having coordinates in the image plane defined relative to x' and y' image plane coordinate axes having an origin of coordinates at principal point $p_O$. By way of example, in FIG. 1A, for convenience of presentation, optical axes OA and OA' are parallel and separated by a distance "d", X, Y, and Z axes are parallel respectively to X', Y', and Z' axes and image planes IP and IP' are coplanar.

It is noted that image planes IP and IP' of component cameras CC and CC' are located along optical axes OA and OA' respectively at distances f and f' from centers of projections C and C' and between C and C' and a scene that is imaged by the component cameras. A photosensor comprising light sensitive pixels on which a scene is generated by a camera having focal length f is parallel to an image plane of the camera and is located on the opposite side of the center of projection of the camera at a distance −f from the center of projection. Coordinates, photosensor coordinates "x", "y" in the photosensor on which a feature of a scene imaged by the camera is generated, are related to image plane coordinates (x,y) of the camera by equations x=−x and y=−y. If pixels in the camera have x and y dimensions $\Delta x_p$ and $\Delta y_p$ respectively in the photosensor, then coordinates x, y may be converted to discrete integer photosensor coordinates, $x_p$ and $y_p$, of pixels in the camera photosensor in accordance with the expressions: $x_p$=ceiling(x/$\Delta x_p$) for x>0; $x_p$=floor(x/$\Delta x_p$) for x<0; $y_p$=ceiling(y/$\Delta y_p$) for y>0, and $y_p$=floor(y/$\Delta y_p$) for y<0.

The discussion that follows uses image plane coordinates and features to describe features of MCI 20 and component cameras CC and CC'. The image plane coordinates are considered to be generic for the image plane coordinates, continuous, and discrete photosensor coordinates. And it is understood that mathematical expressions and features of MCI 20, component camera CC, and/or component camera CC' expressed in terms of image plane features and coordinates are understood to be generic to corresponding photosensor features and continuous or discrete photosensor coordinates. Dimensions in the photosensor of a component camera and/or the component camera's image plane may be expressed in terms of pixel dimensions.

An inset 50 in FIG. 1A schematically shows a very simplified configuration of a camera 60 that comprises elements that may, by way of example, be comprised in a component camera CC or CC'. Camera 60 comprises an optical system, schematically represented by a lens 62, which collects light from a scene image by camera 60 and images the light on pixels 65 of a photosensor 64. Optical system 62 has an optical axis OA', a center of projection CC' and a principal point $p'_O$ located on an image plane IP'. Image plane IP' and photosensor 64 are located on opposite sides of, and equidistant from, optical system 62.

MCI 20 may comprise a controller 22 having a processor 24 configured to process image data based on images acquired by component cameras CC and CC' from a scene imaged by MCI 20 during run-time, and a memory 26. Memory 26 is optionally configured to store image data that processor 24 processes, and executable, image processing instructions that the processor executes to process the stored image data. In an embodiment, the image processing instructions may comprise instructions based on a calibration registration of component cameras CC and CC' determined from images of calibration target 40 acquired by the component cameras, which processor 24 executes to register run-time images acquired by the component cameras to each other.

Processor 24 may comprise any electronic and/or optical processing and/or control circuitry, to provide and enable functionalities that MCI 20 may require to support operation of the MCI. By way of example, processor 24 may comprise any one, or any combination of more than one of, a microprocessor, an application specific circuit (ASIC), field programmable array (FPGA) and/or system on a chip (SOC). Memory 26 may comprise any electronic and/or optical circuitry suitable for storing data and/or computer executable instructions and may, by way of example, comprise any one or any combination of more than one of a flash memory, random access memory (RAM), read only memory (ROM), and/or erasable programmable read-only memory (EPROM).

Calibration target 40 is optionally, as schematically shown in FIG. 1A perpendicular to optical axes OA and OA' of component cameras CC and CC', respectively and is optionally located at a distance $Z_O$ from centers C and C' of the component cameras. Calibration target 40 may comprise an array of any suitable fiducial features that are relatively easily identified in images of the calibration target acquired by component cameras CC and CC'. Optionally, as schematically shown in FIG. 1A, calibration target 40 may comprise an array of equally spaced parallel rows 44 of equally spaced fiducial icons 46, hereafter also simply referred to as fiducials. Optionally, fiducials 46 are arrayed in a rectilinear grid of fiducials so that homologous fiducials 46 in different rows 44 lie along a same column 45 of fiducials perpendicular to rows 44 of fiducials 46. Fiducials 46 in a given row 44 may comprise, by way of example, fiducials having different shapes, colors, and/or identifying features so that it may be relatively easy to distinguish different fiducials and rows and columns of fiducials. By way of example, as schematically shown in FIG. 1A, fiducials 46 in a given row 44 of icons may comprise solid circles alternating with empty circles.

FIG. 1A schematically shows images $p_k$ and $p'_k$ of a given fiducial $P_k$ of fiducials 46 in calibration target 40 that component cameras CC and CC' respectively generate on their image planes IP and IP'. Component camera CC projects image $p_k$ of fiducial $P_k$ onto image plane IP along a projection line $PL_k$ that extends from the fiducial to center C of camera CC. Image $p_k$ is located in image plane IP at a point having image coordinates (x(k), y(k)) measured along coordinate axes x and y respectively at which projection line $PL_k$ intersects image plane IP. Similarly, component camera CC' projects image $p'_k$ of fiducial $P_k$ onto image plane IP' along a projection line $PL'_k$ that extends from the fiducial $P_k$ to center C' of camera CC'. Image $p'_k$ is located in image plane IP' at a point having image coordinates (x'(k), y'(k)) measured along coordinate axes x' and y' respectively, at which projection line $PL'_k$ intersects image plane IP'.

In an embodiment, providing a calibration registration of component cameras CC and CC' comprises determining an initial calibration transform "ICT" for distance $Z_O$ at which calibration target 40 is located. Transform ICT maps images of fiducials 46 projected by component camera CC to image plane IP to images of the same respective fiducials 46 projected to image plane IP' by component camera CC'. Transform ICT operates to transform coordinates (x,y) of an image of a fiducial 46 in calibration target 40 that component camera CC projects to image plane IP to coordinates (x',y') of an image of the same fiducial 46 that component camera CC' projects to image plane IP'. By way of example, in FIG. 1A transform ICT is schematically indicated as mapping image $p_k$ of fiducial $P_k$ in image plane IP to image $p'_k$ of fiducial $P_k$ in image plane IP'.

In an embodiment, transform ICT may be a polynomial transform having a form:

$$x' = \Sigma_{i=0}^{I} \Sigma_{j=0}^{J} a_{ij} x^i y^j; \quad y' = \Sigma_{m=0}^{M} \Sigma_{n=0}^{N} b_{mn} x^m y^n.$$

Transform ICT may be determined based on images, calibration images, of calibration target 40 respectively acquired by component cameras CC and CC' for a same single location and single orientation of calibration target 40 relative to MCI 20. Optionally, the calibration images are substantially simultaneously acquired during a single imaging of calibration target 40 by MCI 20. Any of various fitting algorithms, such as a least squares, a gradient descent, or a mutual information algorithm, may be used to find values for coefficients $a_{ij}$, $b_{mn}$, and index limits I, J, M, and N that provide a satisfactory fit between image plane coordinates (x,y) of images of fiducials 46 in a calibration image acquired by component camera CC to respective image plane coordinates (x',y') of images of fiducials 46 in a calibration image acquired by component camera CC'.

In an embodiment, the calibration image acquired by component camera CC may be used to determine an intrinsic parameter of the component camera. Intrinsic parameters of a camera comprise the camera's focal length, coordinates of the cameras principal point, pixel skew, and image distortion generated by camera optics. Similarly, the calibration image acquired by component camera CC' may be used to determine intrinsic parameters of component camera CC'.

At least one of the intrinsic parameters determined for camera CC may be used to generate a distortion correction transform (DCORT) for component camera CC. DCORT transforms the calibration image of calibration target 40 acquired by component camera CC to remove or moderate distortion in the calibration image that may be generated by the optics of the component camera. Whereas a distorted calibration image may not preserve a relative spatial configuration of fiducials 46 in calibration target 40, the distorted image after transformation by DCORT may substantially preserve the relative spatial relationships of the fiducials in the calibration target. For example, the distorted image may image rows 44 and columns 45 (FIG. 1A) of fiducials 46, which are straight in calibration target 40 as irregular rows and/or columns of fiducials in a calibration image that may not preserve relative spacing between fiducials and/or right angles between the rows and columns. Following transformation by DCORT the image is corrected so that the images preserve the rectilinear configuration and relative spacing that characterizes the configuration of fiducials 46 in calibration target 40. Similarly, at least one of the intrinsic parameters based on the calibration image acquired by component camera CC' may be used to generate a distortion transform DCORT that operates to moderate distortions from the calibration image acquired by the component camera.

Transform ICT may be determined to map images of fiducials 46 between respective calibration images acquired by component cameras CC and CC', for which none, one, or both of the calibration images are corrected for distortion. In the following discussion it is assumed for convenience of presentation that component cameras CC and CC' generate undistorted images, and that transform ICT operates to map "undistorted" image coordinates (x,y) from image plane IP to corresponding undistorted image coordinates (x',y') in image plane IP'.

As noted above, transform ICT is optionally determined with calibration target 40 located at a specific distance $Z_O$ from MCI 20. Transform ICT therefore provides a transform that may generally be acceptably accurate only for features of a scene that are located at distance $Z_O$ from MCI. For distances from MCI 20 other than $Z_O$, transform ICT will in general incorrectly map image coordinates (x,y) of features in an image of a scene acquired by component camera CC to image coordinates (x',y') of features in an image of the same scene acquired by component camera CC'.

To provide for registration of run-time images of a scene acquired by component cameras CC and CC' during run-time imaging for a distance of the scene from MCI 20 other than $Z_O$, controller 22 adjusts mappings of coordinates (x,y) to coordinates (x',y') provided by transform ICT for effects of parallax on the mappings. To enable the adjustments, image coordinates (x,y) in component camera CC image plane IP that transform ICT transforms to image coordinates (x',y') in component camera CC' image plane IP' are associated with an epipolar line segment in image plane IP'. The epipolar line segment corresponds to a segment of a projection line along which component camera CC projects an image of a feature in a scene imaged by MCI 20 to image plane coordinates (x,y) that are transformed by transform ICT to image plane coordinates (x'y'). Length of the epipolar line segment may be a function of a depth range of distances for which MCI 20 is configured to operate.

To register run-time images acquired by component cameras CC and CC' of a scene imaged by MCI 20, processor 24 may process the run-time image acquired by component camera CC using a suitable pattern recognition algorithm to identify features, hereinafter also referred to as "anchor features", in the image that are expected to be relatively easy to identify in the corresponding run-time image of the scene acquired by component camera CC'. Let (x(q), y(q)) represent the (x,y) coordinates in image plane IP of component camera CC of a q-th anchor feature of Q anchor features identified by processor 24 in the run-time image of the scene acquired by component camera CC. Processor 24 uses transform ICT to transform the respective coordinates (x(q), y(q)), 1≤q≤Q of the Q identified anchor features to determine respective corresponding transform ICT coordinates (x'(q,ICT),y'(q,ICT)) in image plane IP' of component camera CC'. The processor may then search neighborhoods of the epipolar line segments respectively associated with the transform ICT coordinates (x'(q,ICT),y'(q,ICT)) to identify the anchor features in the image of the scene acquired by component camera CC' and determine image coordinates x'(q), y'(q)) 1≤q≤Q in CC' in image plane IP' for the anchor features. A neighborhood for an epipolar line segment in image plane IP' may include a region of IP' extending for distances of up to about three or five times a characteristic dimension of a pixel such as the $\Delta x_p$ dimension or $\Delta y_p$ dimension, or diagonal dimension of a pixel in a photosensor on which component camera CC' images scenes.

In an embodiment, processor 24 adjusts at least one of values of $a_{ij}$, $b_{mn}$, and index limits I, J, M, and N that define ICT to provide a transform ICT* which transforms (x(q), y(q)) to (x'(q), y'(q)) for 1≤q≤Q, with acceptable accuracy. In an embodiment, having determined transform ICT* processor 24 uses ICT* to register the image of the scene acquired by component camera CC to that acquired by component camera CC'.

By using epipolar line segments associated with image plane coordinates (x'(q,ICT),y'(q,ICT)) to determine where to search for and identify anchor features in accordance with an embodiment of the disclosure, processor 24 may locate anchor features in a run-time image of a scene acquired by component camera CC' by processing relatively smaller regions of the image than might otherwise be required. As a result, MCI 20 is configured to provide run-time registration of images acquired by its component cameras CC and CC' based on a relatively simple and easily provided calibration registration.

FIG. 1B schematically illustrates relationships between an operating depth range of MCI 20, a projection line $PL_k$ along which component camera CC projects an image of fiducial $P_k$ in calibration target 40 to an epipolar line segment 200 in image plane IP' corresponding to the projection line. MCI 20 is assumed to have a depth range that extends from ($Z_O-\Delta Z$) to ($Z_O+\Delta Z$) and is bounded by planes respectively labeled by $Z_O-\Delta Z$ and $Z_O+\Delta Z$.

Let fiducial $P_k$ in calibration target 40 have coordinates ($X_k(Z_O)$, $Y_k(Z_O)$, $Z_O$) in coordinate system S of component camera CC. Component camera CC projects an image $p_k$ of fiducial $P_k$ to imaging plane IP along projection line $PL_k$ that extends from center C of component camera CC through coordinates ($X_k(Z_O)$, $Y_k(Z_O)$, $Z_O$). X and Y coordinates in coordinate system S of any point lying on projection line $PL_k$ may therefore be written, $$X(Z)=\alpha_k Z, \ Y(Z)=\beta_k Z, \text{ where } \alpha_k=X_k/Z_O \text{ and } \beta_k=Y_k/Z_O.$$

Image coordinates on image plane IP of image $p_k$ of calibration icon $P_k$ as well as image coordinates on IP of any point on projection line $PL_k$ may therefore be written, $x_k=\alpha_k f$ and $y_k=\beta_k f$.

The coordinates of $P_k$ in imaging system S' of component camera CC' may be written $$X'_k(Z_O)=X_k(Z_O)+d=(\alpha_k Z_O+d),\ Y'_k(Z_O)=\beta_k Z_O,\ Z'_O=Z_O.$$

And the image coordinates of image $p'_k$ of fiducial $P_k$ on image plane IP' of component camera CC' that correspond to the image coordinates $(x_k,y_k)$ of the point in image plane IP may be written $x'_k=f(\alpha_k+d/Z_O)$ and $y'_k=\beta_k f$.

Whereas any point of a feature in a scene imaged by component camera CC (?) that lies on projection line $PL_k$ is imaged to the same imaging coordinates $(x_k,y_k)$ in image plane IP, points at different locations along projection line $PL_k$ are not imaged by component camera CC' to same image coordinates in image plane IP'. However, any point of a feature of a scene located in the operating distance range $Z_O-\Delta Z$ and $Z_O-\Delta Z$ of CC that is imaged by MCI 20 at imaging coordinates $(x_k,y_k)$, lies on a projection line segment 100, shown emphasized by a bold line, of projection line $PL_k$. And any point in projection line segment 100 is imaged to epipolar line segment 200 in image plane IP'. Characteristics of an epipolar line segment 102 may be determined from projections of endpoints 101 and 102 of projection line segment 100 by component camera CC' onto image plane IP'.

Endpoints 101 and 102 of projection line segment 100 have real space Z coordinates $Z_O-\Delta Z$ and $Z_O+\Delta Z$ respectively in coordinate system S and corresponding X and Y coordinates:

$$X_k(Z_O-\Delta Z)=\alpha_k\cdot(Z_O-\Delta Z)\equiv X_k(-),\ Y_k(Z_O-\Delta Z)=\beta_k\cdot(Z_O-\Delta Z)\equiv Y_k(-);\ \text{and}$$

$$X_k(Z_O+\Delta Z)=\alpha_k\cdot(Z_O+\Delta Z)\equiv X_k(+),\ Y_k(Z_O+\Delta Z))=\beta_k\cdot(Z_O+\Delta Z)\equiv Y_k(+).$$

In coordinate system S' of component camera CC' endpoints 101 and 102 have coordinates: $X'_k(-)=X_k(-)+d,=(\alpha_k\cdot(Z_O-\Delta Z)+d)$ and $Y'_k(-)=Y_k(-)=\beta_k\cdot(Z_O-\Delta Z)$; and $$X'_k(+)=X_k(+)+d=(\alpha_k\cdot(Z_O+\Delta Z)+d)\ \text{and}\ Y'_k(+)=Y_k(+)=\beta_k\cdot(Z_O+\Delta Z).$$

Images 201 and 202 of endpoints 101 and 102 respectively projected by component camera CC' to image plane IP' have respective coordinates $(x'_k(-),y'_k(-))$ and $(x'_k(+),y'_k(+))$ in image plane IP' where:

$$x'_k(-)=fX'_k(-)/(Z_O-\Delta Z)=f[X_k(-)+d]/(Z_O-\Delta Z)=f[\alpha_k(Z_O-\Delta Z)+d]/(Z_O-\Delta Z)=f\alpha_k+fd/(Z_O-\Delta Z);$$

$$y'_k(-)=fY'_k(-)/(Z_O-\Delta Z)=fY_k(-)/(Z_O-\Delta Z)=f\beta_k;$$

$$x'_k(+)=fX'_k(+)/(Z_O+\Delta Z)=f\alpha_k+fd/(Z_O+\Delta Z);\ \text{and}$$

$$y'_k(+)=fY'_k(+)/(Z_O+\Delta Z)=fY_k(+)/(Z_O+\Delta Z)=f\beta_k.$$

From the coordinates of images in image plane IP' of fiducial $P_k$ and endpoints 101 and 102 of projection line segment 100, it is seen that epipolar line segment 200 passes through coordinates $(x'_k,y'_k)$ of image $p'_k$ in image plane IP', has a slope 0 and is parallel to the x' axis in image plane IP'. The epipolar line segment has a length equal to $2f d\Delta Z/[(Z_O+\Delta Z)(Z_O-\Delta Z)] \sim (f d\Delta Z/Z_O^2)[1+\Delta Z^2/Z_O^2-2\Delta Z^4/Z_O^4 \ldots]$ However, an epipolar line segment in component camera CC' image plane IP' that corresponds to a projection line of component camera CC may not maintain slope zero and remain parallel to the x' axis of image plane IP' for rotations of component camera CC' about its center C'. By way of example, FIG. 1C schematically shows a MCI 120 similar to MCI 20 and comprising component cameras CC and CC' in which the component cameras are rotated by pan angles relative to calibration target 40. For a pan angle rotation of component camera CC' about the Y' axis of coordinate system S', an epipolar line segment corresponding to projection line segment $PL_k$ in general is not parallel to the x' axis and is a function of the pan angle. The slope of the epipolar line segment may be determined by determining the pan angle, transforming coordinates in coordinate system S' of endpoints 101 and 102 of projection line segment 100 for rotation by the pan angle, and projecting the rotated endpoints onto image plane IP'. The projected coordinates may be used to determine slope of the epipolar line segment.

In an embodiment of the disclosure, pan and tilt angle rotations of a component camera, for example component camera CC or CC' in MCI 20, may be determined based on a convergence angle of an image of parallel rows and/or parallel columns of fiducials in a calibration target. By way of example, FIG. 2A schematically shows how pan angle rotations of component cameras CC and CC' of MCI 120 may affect imaging a planar calibration target 140 having an array of parallel rows 141 of fiducials 142. Component cameras CC and CC' are by way of example, rotated about their respective Y and Y' axes by pan angles −y and +y respectively away from a normal N to calibration target 140. As a result, as schematically shown in FIG. 2A, in image plane IP of component camera CC, images 241 of parallel fiducial rows 141 comprised in calibration target 40 are not parallel but converge in the direction of the minus x axis of image plane IP. On the other hand in image plane IP' of component camera CC', image fiducial rows 241' comprised in calibration target 140 converge in the direction of the plus x' axis of image plane IP'.

Figure 2B:
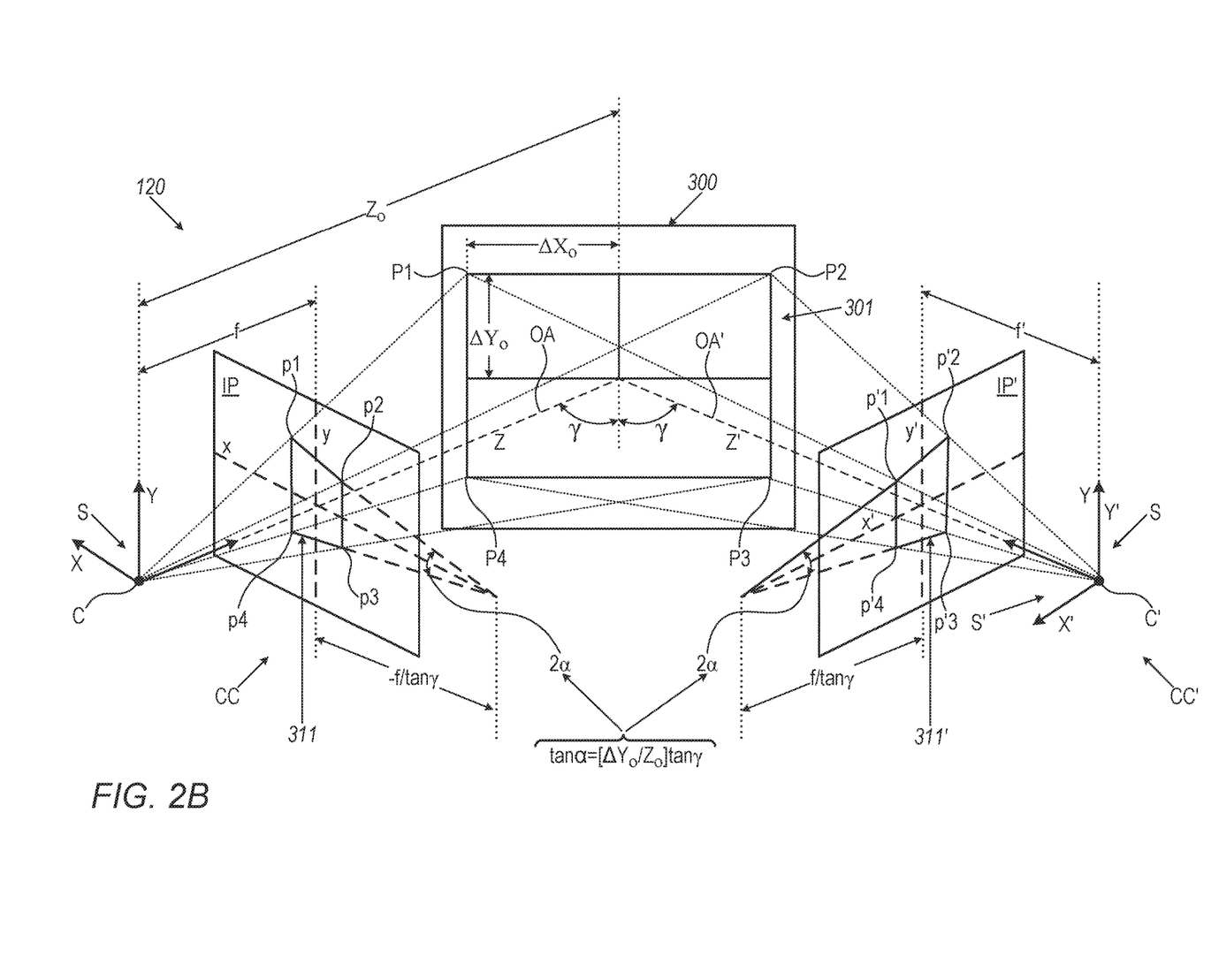
Figure 3:
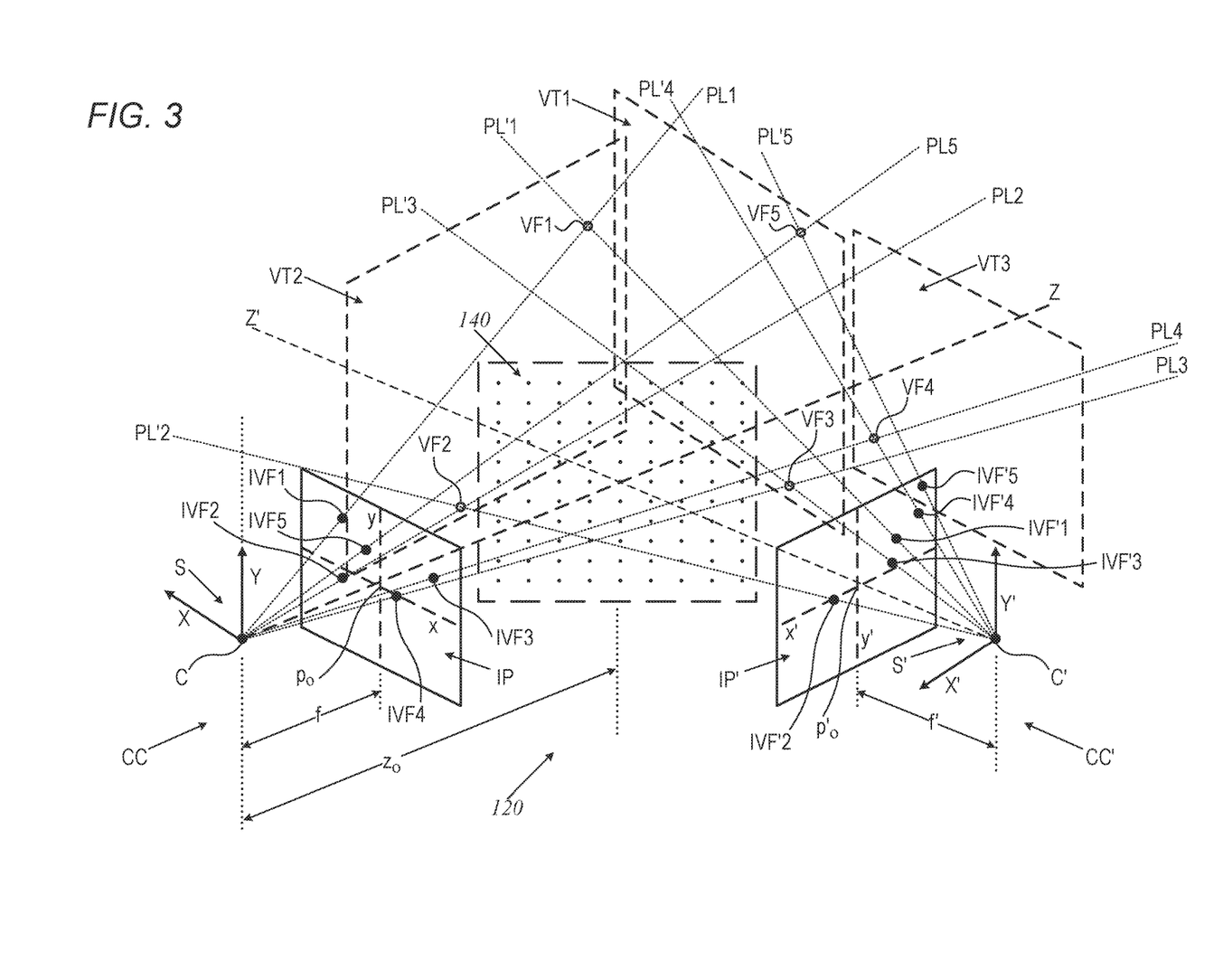
FIG. 3 schematically shows generating a plurality of virtual calibration fiducials for registering component cameras of a MCI based on an image of a real calibration target acquired by the MCI, in accordance with an embodiment of the disclosure.

FIG. 2B schematically illustrates determining pan angles of rotation for component cameras CC and CC' based on images that the component cameras acquire of a rectangle 301 comprised in a calibration target 300. Rectangle 301 has vertices P1, P2, P3, and P4 in calibration target 300. The vertices define parallel top and bottom sides P1-P2 and P3-P4 respectively of the rectangle that are separated by a distance $2\Delta Y_O$ and parallel left and right sides P1-P4 and P2-P3 respectively of the rectangle separated by a distance $2\Delta X_O$. Component camera CC images rectangle 301 as a trapezoid 311 having in image plane IP image vertices p1, p2, p3, and p4 corresponding to vertices P1, P2, P3, and P4 respectively. Similarly, component camera CC' images rectangle 301 as a trapezoid 311' having in image plane IP' image vertices p'1, p'2, p'3 and p'4 corresponding to vertices P1, P2, P3, and P4 respectively.

From coordinates of image vertices p1, p2, in image plane IP, it may be determined that a line p1-p2 between image vertices p1 and p2 in the image plane that images top side P1-P2 of rectangle 301 makes an angle α with an x axis of image plane IP and that $\tan\alpha=(\Delta Y_O/Z_O)\tan\gamma$. It is noted that $\tan\alpha$ increases with increase in $\Delta Y_O/Z_O$ and that line p1-p2 crosses the x axis at a point $-f/\tan\gamma$. Similarly a line p3-p4 between image vertices p3 and p4 in image plane IP that images bottom side P4-P3 of rectangle 301 makes an angle $-\alpha$ with the x axis of image plane IP, that $\tan\alpha=(\Delta Y_O/Z_O)\tan\gamma$, and that line p3-p4 also crosses the x axis at $-f/\tan\gamma$.

From the results for trapezoidal image 311 of rectangle 301 acquired by component camera CC, it may be seen that all image fiducial rows 241 in image plane IP of component camera CC shown in FIG. 2A converge to a same point, $x(0)=-f/\tan \gamma$, along the x-axis of the image plane. An angle between a pair of adjacent image fiducial rows 241 in image plane IP is equal to $(\Delta Y/Z_O)\tan \gamma$ where $\Delta Y$ is a spacing between adjacent fiducial rows 141 (FIG. 2A) in calibration target 140 that are imaged in the pair of image fiducial rows. If $\bar{x}(0)$ is an average x coordinate of intersections x(0) of image fiducial rows 241 with the x axis in image plane IP, then the pan angle, $\gamma(CC)$, of component camera CC may be estimated as $\gamma=\arctan[f/\bar{x}(0)]$ Similar to the case for component camera CC, component camera CC' images parallel rows 141 of fiducials 142 in calibration target 140 to image fiducial rows 241' that converge to a point $x'(0)=f/\tan \gamma$ along a positive x' axis of image plane IP'. And an angle between a pair of adjacent image fiducial rows 241' in image plane IP' is equal to $(\Delta Y/Z_O)\tan \gamma$. If $x'(0,IP')$ is an average of x' coordinates of intersections of image fiducial rows 241' with the x' axis in image plane IP', then the pan angle, $\gamma(CC')$, of component camera CC may be estimated as $\gamma(CC')=\arctan(f/\bar{x}'(0))$ As in the case for rows of fiducial lines a tilt angle of a component camera CC or CC' may be estimated from convergence of columns of fiducials in a calibration target. It is noted that for small tilt angles, convergence of rows of pixels generated by a pan angle of a component camera CC or CC' is relatively independent of tilt angle. And for small pan angles, convergence of columns of pixels generated by a tilt angle of a component camera CC or CC' is relatively independent of pan angle. In an embodiment of the disclosure measurements of convergence of both rows and columns of fiducials may be used to determine both pan and tilt angles of a component camera CC or CC'.

It is noted that whereas in the above description component camera pan and tilt angles are described as being determined from images of a calibration target having parallel lines of fiducials. However, practice of an embodiment of the disclosure is not limited to imaging parallel lines of fiducials. A component camera pan or tilt angle changes an angle between images of two lines in a scene relative to an angle between the lines in the scene independent of whether the lines in the scene are parallel or not. Comparing angles between lines in a scene to angles between lines in an image of the scene that image the lines in scene may be used to determine pan and/or tilt angles independent as to whether or not the lines in the scene are parallel.

It is noted that registration based on a polynomial transform, such as transform ICT, optionally determined in a calibration procedure for which a calibration target is imaged at a single distance from a MCI may not be compatible with a conventional MCI that is configured to register images based on a fundamental matrix F. In an embodiment of the disclosure, a transform ICT determined for an MCI is used to generate F for the MCI. The transform ICT is used to determine a plurality of virtual calibration targets at different distances and/or orientations in the field of view of the MCI 20. Virtual fiducials in the virtual calibration targets are used to determine coordinates for images, hereinafter also referred to as virtual images, that the component cameras would project to their image planes were the virtual fiducials real. For each of at least eight virtual fiducials, corresponding coordinates of images of the virtual fiducial in the image planes of the component cameras are used to determine F.

FIG. 3 schematically shows by way of example, virtual targets VT1, VT2, and VT3 and virtual fiducials VF1, VF2, . . . , VF5 that they comprise, which may be used to determine F for MCI 120, in accordance with an embodiment of the disclosure. Virtual fiducials VF1, VF2, . . . VF5 may be defined by choosing real space coordinates relative to MCI 120 advantageously at different distance from MCI 120 and in a field of view of the MCI. Given transform ICT based on real calibration target 140, real space coordinates may be determined for centers of projection C and C', focal lengths f and f, as well as location of principal point $p_O$ and $p'_O$ for component cameras CC and CC'. From the locations of center of projection C and the real space coordinates of virtual fiducials VF1, VF2, . . . VF5, image projections lines PL1, PL2, . . . PL5 along which virtual images IVF1, IVF2, . . . IVF5 of the virtual fiducial respectively are projected onto image plane IP may be determined. Similarly, from the locations of center C' and the real space coordinates of virtual fiducials VF1, VF2, . . . , VF5, image projections lines PL'1, PL'2, . . . PL'5 along which virtual images IVF'1, IVF'2, . . . , IVF'5 of the virtual fiducials respectively are projected onto image plane IP' may be determined. The image coordinates of virtual images IP1, IP2, . . . , IP5 and IP'1, IP'2, . . . IP'5 respectively may be used to determine the fundamental matrix for MCI 120.

There is therefore provided in accordance with an embodiment of the disclosure a multi-camera imager (MCI) comprising: first and second cameras each having a center of projection, an optical axis extending from the center of projection, an image plane intersected by the optical axis at a principal point and a photosensor comprising pixels on which the camera images scenes; a memory having stored therein: instructions executable to implement a first transform configured to map image plane coordinates of features of a scene located at a same predetermined distance from the MCI imaged by the first camera to image plane coordinates of the same features imaged by the second camera; data defining an epipolar line segment in the image plane of the second camera that corresponds to a projection line in the first camera, for each of a plurality of image plane coordinates in the image plane of the first camera; and instructions executable to adjust the first transform based on the epipolar line segments to provide a second transform configured to map image plane coordinates of features of a scene located at a distance from the MCI different from the predetermined distance that are imaged by the first camera to image coordinates of the same features imaged by the second camera; and a processor configured to register images of a scene acquired by the first and second cameras to each other based on the instructions and data stored in the memory.

Optionally the first transform comprises a polynomial transform. Optionally the first transform is determined based on first and second images of fiducials in a calibration target respectively acquired by the first and second cameras from imaging the target at a same single position and orientation relative to the MCI. Optionally each epipolar line segment in the image plane of the second camera corresponds to a segment of a different projection line that extends from a fiducial in the calibration target to the center of projection of the first camera along which the first camera projects an image of a feature in the calibration target to the image plane of the first camera.

In an embodiment, the segment of the projection line has ends that are located substantially at lower and upper bound limits of an operating distance range of the MCI.

In an embodiment, the processor is configured to register a first image of a scene acquired by the first camera to a second image of the same scene acquired by the second camera based on the processor identifying a feature in the first image and searching for the same feature in the second image in a region of the second image based on a neighborhood of an epipolar line segment associated with a projection line along which the first camera projects an image of the feature. Optionally the neighborhood of the epipolar line comprises a region of the image plane of the second camera that extends from the epipolar line segment to a distance less than or equal to about five characteristic dimensions of a photosensor pixel of the second camera. Optionally the instructions to adjust the first transform to provide the second transform comprises instructions to adjust the first transform to transform image plane coordinates of the feature in the first image to image plane coordinates of the feature in the second image.

In an embodiment the target is a planar target and the optical axis of at least one of the cameras is perpendicular to the target. In an embodiment, the optical axes of the first and second cameras are parallel.

There is further provided in accordance with an embodiment of the disclosure a method of registering a first camera to a second camera of a multi-camera imager (MCI), each camera having a center of projection, an optical axis extending from the center of projection, an image plane intersected by the optical axis at a principal point and a photosensor comprising pixels on which the camera images scenes, the method comprising: providing a calibration target at a known position and known orientation relative to the MCI, the calibration target having fiducials; operating the first and second cameras to acquire first and second images of the calibration target at the known position and orientation; using the first and second images to determine a first transform configured to map image plane coordinates in the image plane of the first camera of images of fiducials in the calibration target imaged in the first image to image plane coordinates in the image plane of the second camera of images of the same fiducials imaged by the second camera in the second image; and associating an epipolar line segment in the image plane of the second camera that corresponds to a projection line in the first camera for each of a plurality of image plane coordinates in the image plane of the first camera.

In an embodiment the method comprises configuring the MCI to adjust the first transform to generate a second transform based on the epipolar line segments. Optionally, the first transform comprises a polynomial transform. Optionally, each epipolar line segment corresponds to a segment of a different projection line that extends from a fiducial in the calibration target to the center of projection of the first camera along which the first camera projects an image of a feature in the calibration target to the image plane of the first camera. Optionally, the segment of the projection line has ends that are located substantially at lower and upper bound limits of an operating distance range of the MCI.

In an embodiment configuring the MCI to adjust the first transform to generate a second transform function based on the epipolar line segments comprises configuring the MCI to identify a feature in a first image of a scene acquired by the first camera and search for the same feature in a second image of the same scene acquired by the second camera in a region of the second image based on a neighborhood of an epipolar line segment associated with a projection line along which the first camera projects an image of the feature. Optionally, the neighborhood of the epipolar line comprises a region of the image plane of the second camera that extends from the epipolar line segment to a distance less than or equal to about five characteristic dimensions of a photosensor pixel of the second camera. Optionally, configuring the MCI to adjust the first transform comprises configuring the MCI to adjust the first transform to transform image plane coordinates of the feature in the first image to image plane coordinates of the feature in the second image.

In an embodiment the target is a planar target and the optical axis of at least one of the cameras is perpendicular to the target. In an embodiment the optical axes of the first and second cameras are parallel.

There is further provided in accordance with an embodiment of the disclosure a method of registering a first camera to a second camera of a multi-camera imager (MCI), each camera modeled as a pin hole camera having a center of projection, an optical axis extending from the center of projection, a camera coordinate system having an origin at the center of projection and a Z axis coincident with the optical axis, an image plane intersected by the optical axis at a principal point, and a photosensor comprising pixels on which the camera images scenes, the method comprising: operating the first and second cameras to acquire first and second images respectively of a calibration target located at a known position relative to the MCI and comprising fiducials that define at least two lines in the calibration target; determining at least one angle between two lines defined by images of the fiducials in a projection of the image of the calibration target acquired by at least one of the first and second cameras on the image plane of the camera; and using the at least one angle to register the first and second cameras to each other.

Optionally using the at least one angle comprises determining an orientation angle between the optical axis of the at least one camera and a normal to a plane including the at least two lines in the calibration target. Optionally the at least two lines in the calibration target comprise at least two parallel first lines, and wherein determining at least one angle comprises determining a convergence angle $\alpha$ between two lines defined by the images of the fiducials in the projection of the image. Optionally determining the orientation angle comprises determining a pan angle $\gamma$ of rotation of the camera based on the convergence angle $\alpha$.

In an embodiment the method comprises determining the pan angle $\gamma$ based on the expression $\tan \alpha = (\Delta Y_O / Z_O) \tan \gamma$ where $\Delta Y_O$ is a distance between the two parallel first lines in the calibration target and $Z_O$ is a distance between the projection point of the at least one camera and an intersection of the plane of the two parallel first lines in the calibration target and the optical axis of the at least one camera. Optionally determining the pan angle $\gamma$ based on an expression $\gamma = \arctan(f/\bar{x})$ where f represents the focal length of the camera and $\bar{x}$ represents a distance from the principal point of the at least one camera of an intersection of the lines that determine the angle $\alpha$. Optionally the at least two lines in the calibration target comprise at least two parallel second lines that are not parallel to the first lines and wherein determining at least one angle comprises determining a convergence angle $\beta$ between two lines defined by images of the fiducials that define the second lines in the projection of the image. Optionally the at least two second parallel lines are perpendicular to the at least two first parallel lines. Optionally determining the orientation angle comprises determining a tilt angle $\delta$ of rotation of the camera based on the convergence angle $\beta$.

In an embodiment the method comprises determining the tilt angle $\delta$ based on the expression $\tan \beta = (\Delta X_O / Z_O) \tan \delta$ where $\Delta X_O$ is a distance between two parallel second lines of the at least two second lines and $Z_O$ is a distance between the projection point of the at least one camera and an intersection of the plane of the two parallel second lines and the optical axis of the at least one camera.

In an embodiment the method comprises determining the tilt angle δ based on an expression δ=arctan(f/y) where f represents the focal length of the camera and y represents a distance from the principal point of the at least one camera of an intersection between images of lines defined by images of the fiducials in the projected image that define the second lines.

In an embodiment the method comprises comparing the convergence angles α and β to values in a lookup table that tabulates pan and tilt angles of a camera as functions of convergence angles α and β to determining pan and tilt angels for the at least one camera. Optionally using the at least one convergence angle comprises generating the lookup table.

In an embodiment the optical axis of each of the first and second cameras is defined by an optical system that projects the image of the calibration target acquired by the camera and determining the at least one angle comprises processing the projected image to remove distortion in the projected image introduced by the optical system of the at least one of the first and second camera. Optionally, generating the lookup table comprises: imaging a calibration target comprising at least two parallel rows of fiducials and at least two parallel columns of fiducials that are perpendicular to the rows with a camera oriented at a plurality of different known pan angles and a plurality of different known tilt angles; determining for each pair of a known pan angle of the plurality of known pan angles and a known tilt angle of the plurality of tilt angles a convergence angle for images of the at least two rows of fiducials and images of the at least two columns of fiducials in the image of the calibration target acquired by the camera at the known pan and tilt angles in the pair; and tabulating the known pan and tilt angles as functions of the convergence angles.

In an embodiment the method comprises using the pan and tilt angles to determine a relative rotation between the camera coordinate systems of the first and second cameras and using the determined relative rotation to register the first and second cameras to each other.

In an embodiment the MCI comprises a plurality of cameras greater than two. In an embodiment the method comprises calibrating each of the plurality of cameras to another of the plurality of cameras so that all of the plurality of cameras are registered one to the other.

There is further provided in accordance with an embodiment of the disclosure a multi-camera imager (MCI) comprising: first and second cameras each having a center of projection, an optical axis extending from the center of projection and an image plane intersected by the optical axis at a principal point; and a controller configured to: determine a first angle between lines defined by images of features of a scene in a first image that the first camera projects onto the image plane of the first camera and a second angle between lines defined by images of the same features of the scene in a second image that the second camera projects onto the image plane of the second camera; use the first and second angles to determine a relative rotation between the camera coordinate systems of the first and second cameras; and use the relative rotation to register images acquired by one of the first and second cameras to the other of the first and second cameras.

Optionally the features in the scene that define the first and second lines in the in the first and second images define parallel lines in the scene and determining the first and second angles comprises determining a first convergence angle between the first line in the first image and a second convergence angle between the second lines in the second image.

There is further provided in accordance with an embodiment of the disclosure a multi-camera imager (MCI) comprising: first and second cameras each having a center of projection, an optical axis extending from the center of projection and an image plane intersected by the optical axis at a principal point; a memory having stored therein: a fundamental matrix based on a polynomial transform configured to map image plane coordinates of images of features of a calibration target imaged by the first camera on the image plane of the first camera to image plane coordinates of images of the same features of the calibration target as imaged by the second camera on the image plane of the second camera; and instructions executable to register images of a scene acquired by the first and second cameras to each other based on the fundamental matrix; and a processor configured to execute the instructions to register the images of the scene based on the fundamental matrix. Optionally, the memory comprises the polynomial transform.

Optionally, the instructions comprise instructions executable to transform image plane coordinates of features of the scene imaged by the first camera to image plane coordinates of the same features of the scene as imaged by the second camera. In an embodiment the polynomial transform is determined from first and second images respectively acquired by the first and second cameras of the calibration target located at a same, only one, known position, and at a same, only one, known orientation relative to the MCI. Optionally, the features of the calibration target comprise an array of fiducials.

In an embodiment the fundamental matrix is determined based on real spatial coordinates selected for a plurality of "N" virtual fiducials in a field of view (FOV) of the MCI. Optionally, components of the fundamental matrix are functions of image plane coordinates of a virtual image of each of the plurality of virtual fiducials in the image plane of the first camera and matching image plane coordinates of a virtual image of the virtual fiducial in the image plane of the second camera. Optionally, the coordinates of the virtual image of a virtual fiducial in the image plane of the first or second camera are image plane coordinates of an intersection of a line that connects the real spatial coordinates of the virtual fiducial and real spatial coordinates of the center of projection of the camera. Optionally, if a vector x(n) represents the image coordinates for the virtual image of an n-th virtual fiducial in the image plane of the first camera and a vector x'(n) represents the image coordinates of the virtual image of the n-th virtual fiducial in the image plane of the second camera the components of the fundamental matrix are determined based on N equations $x'(n)^T F x(n) = 0$, $1 \leq n \leq N$, where $x'(n)^T$ is a transpose of the vector x'(n). In an embodiment, the optical axes of the first and second camera are parallel.

There is further provided in accordance with an embodiment of the disclosure a method of registering first and second cameras comprised in a multi-camera imager (MCI), each camera having a center of projection, an optical axis extending from the center of projection and an image plane intersected by the optical axis, the method comprising: operating the MCI to image a calibration target and acquire first and second images of the calibration target by the first and second cameras respectively; determining a polynomial transform configured to map image plane coordinates of images of features of the calibration target in the first image on the image plane of the first camera to image plane coordinates of images of the same features in the second image on the image plane of the second camera; and using the polynomial transform to determine a fundamental matrix for the first and second cameras. Optionally, operating the MCI comprises operating the MCI to image the calibration target located at a same, only one, known position, and at a same, only one, known orientation relative to the MCI.

In an embodiment the method comprises selecting real space coordinates for each of a plurality of N virtual fiducials in the field of view of the first and second cameras that are not real spatial coordinates of a feature of the calibration target as imaged by the MCI. Optionally, selecting real space coordinates comprises selecting coordinates of a three dimensional point lattice. In an embodiment selecting comprises selecting real space coordinates for which distances from the center of projection of the first or second camera to the real space coordinates have different projections on the optical axis of the camera. In an embodiment the optical axes of the first and second cameras are parallel.

In an embodiment the method comprises for each of the N virtual fiducials determining image plane coordinates of a virtual image of the virtual fiducial in the image plane of the first camera and matching image plane coordinates of a virtual image of the virtual fiducial in the image plane of the second camera. Optionally, determining image plane coordinates for the virtual image in the image plane of the first or second camera comprises determining image plane coordinates of an intersection of a line that connects the real spatial coordinates of the virtual fiducial and real spatial coordinates of the center of projection of the camera.

If a vector x(n) represents the image coordinates for the virtual image of an n-th virtual fiducial in the image plane of the first camera and a vector x'(n) represents the image coordinates of the virtual image of the n-th virtual fiducial in the image plane of the second camera determining the fundamental matrix may comprise determining components of the fundamental matrix that satisfy N equations $x'(n)^T F x(n) = 0$, $1 \leq n \leq N$, where $x'(n)^T$ is a transpose of the vector $x'(n)$.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments. Some embodiments utilize only some of the features or possible combinations of the features. Variations of embodiments of the disclosure that are described, and embodiments comprising different combinations of features noted in the described embodiments, will occur to persons of the art. The scope of the invention is limited only by the claims.

The invention claimed is:

1. A multi-camera imager (MCI) comprising:
   first and second cameras each having a center of projection, an optical axis extending from the center of projection, an image plane intersected by the optical axis at a principal point and a photosensor comprising pixels on which the camera images scenes;
   a memory having stored therein:
   instructions executable to implement a first transform configured to map image plane coordinates of features of a scene located at a same predetermined distance from the MCI imaged by the first camera to image plane coordinates of the same features imaged by the second camera;
   data defining an epipolar line segment in the image plane of the second camera that corresponds to a projection line in the first camera, for each of a plurality of image plane coordinates in the image plane of the first camera; and
   instructions executable to adjust the first transform based on the epipolar line segments to provide a second transform configured to map image plane coordinates of features of a scene located at a distance from the MCI different from the predetermined distance that are imaged by the first camera to image coordinates of the same features imaged by the second camera; and
   a processor configured to register images of a scene acquired by the first and second cameras to each other based on the instructions and data stored in the memory.

2. The MCI according to claim 1 wherein the first transform comprises a polynomial transform.

3. The MCI according to claim 1 wherein the first transform is determined based on first and second images of fiducials in a calibration target respectively acquired by the first and second cameras from imaging the target at a same single position and orientation relative to the MCI.

4. The MCI according to claim 3 wherein each epipolar line segment in the image plane of the second camera corresponds to a segment of a different projection line that extends from a fiducial in the calibration target to the center of projection of the first camera along which the first camera projects an image of a feature in the calibration target to the image plane of the first camera.

5. The MCI according to claim 3 wherein the target is a planar target and the optical axis of at least one of the cameras is perpendicular to the target.

6. The MCI according to claim 1 wherein the segment of the projection line has ends that are located substantially at lower and upper bound limits of an operating distance range of the MCI.

7. The MCI according to claim 1 wherein the processor is configured to register a first image of a scene acquired by the first camera to a second image of the same scene acquired by the second camera based on the processor identifying a feature in the first image and searching for the same feature in the second image in a region of the second image based on a neighborhood of an epipolar line segment associated with a projection line along which the first camera projects an image of the feature.

8. The MCI according to claim 7 wherein the neighborhood of the epipolar line comprises a region of the image plane of the second camera that extends from the epipolar line segment to a distance less than or equal to about five characteristic dimensions of a photosensor pixel of the second camera.

9. The MCI according to claim 7 wherein the instructions to adjust the first transform to provide the second transform comprises instructions to adjust the first transform to transform image plane coordinates of the feature in the first image to image plane coordinates of the feature in the second image.

10. The MCI according to claim 1, wherein the optical axes of the first and second cameras are parallel.

11. A method of registering a first camera to a second camera of a multi-camera imager (MCI), each camera having a center of projection, an optical axis extending from the center of projection, an image plane intersected by the optical axis at a principal point and a photosensor comprising pixels on which the camera images scenes, the method comprising:

providing a calibration target at a known position and known orientation relative to the MCI, the calibration target having fiducials;

operating the first and second cameras to acquire first and second images of the calibration target at the known position and orientation;

using the first and second images to determine a first transform configured to map image plane coordinates in the image plane of the first camera of images of fiducials in the calibration target imaged in the first image to image plane coordinates in the image plane of the second camera of images of the same fiducials imaged by the second camera in the second image; and associating an epipolar line segment in the image plane of the second camera that corresponds to a projection line in the first camera for each of a plurality of image plane coordinates in the image plane of the first camera.

12. The method according to claim 11 and comprising configuring the MCI to adjust the first transform to generate a second transform based on the epipolar line segments.

13. The method according to claim 12 wherein configuring the MCI to adjust the first transform to generate a second transform function based on the epipolar line segments comprises configuring the MCI to identify a feature in a first image of a scene acquired by the first camera and search for the same feature in a second image of the same scene acquired by the second camera in a region of the second image based on a neighborhood of an epipolar line segment associated with a projection line along which the first camera projects an image of the feature.

14. The method according to claim 13 wherein the neighborhood of the epipolar line comprises a region of the image plane of the second camera that extends from the epipolar line segment to a distance less than or equal to about five characteristic dimensions of a photosensor pixel of the second camera.

15. The method according to claim 13 wherein configuring the MCI to adjust the first transform comprises configuring the MCI to adjust the first transform to transform image plane coordinates of the feature in the first image to image plane coordinates of the feature in the second image.

16. The method according to claim 11 wherein the first transform comprises a polynomial transform.

17. The method according to claim 11 wherein each epipolar line segment corresponds to a segment of a different projection line that extends from a fiducial in the calibration target to the center of projection of the first camera along which the first camera projects an image of a feature in the calibration target to the image plane of the first camera.

18. The method according to claim 17 wherein the segment of the projection line has ends that are located substantially at lower and upper bound limits of an operating distance range of the MCI.

19. The method according to claim 11 wherein the target is a planar target and the optical axis of at least one of the cameras is perpendicular to the target.

20. The method according to claim 11 wherein the optical axes of the first and second cameras are parallel.

* * * * *